United States Patent
Medovich

(10) Patent No.: US 8,863,127 B2
(45) Date of Patent: *Oct. 14, 2014

(54) VIRTUAL MACHINE UTILITY COMPUTING METHOD AND SYSTEM

(71) Applicant: VMware, Inc., Palo Alto, CA (US)

(72) Inventor: Mark Medovich, Lyndhurst, OH (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,475

(22) Filed: Dec. 17, 2012

(65) Prior Publication Data

US 2013/0111476 A1    May 2, 2013

Related U.S. Application Data

(63) Continuation of application No. 12/366,008, filed on Feb. 5, 2009, now Pat. No. 8,336,049.

(51) Int. Cl.
*G06F 9/455* (2006.01)
*G06Q 30/04* (2012.01)
*G06F 9/50* (2006.01)
*G06Q 30/02* (2012.01)

(52) U.S. Cl.
CPC .......... *G06F 9/455* (2013.01); *G06F 9/45533* (2013.01); *G06Q 30/04* (2013.01); *G06F 9/5077* (2013.01); *G06Q 30/0202* (2013.01)
USPC ............................................................ 718/1

(58) Field of Classification Search
CPC ............................... G06F 9/455; G06F 9/5077
See application file for complete search history.

(56) References Cited

U.S. PATENT DOCUMENTS

| | | | |
|---|---|---|---|
| 6,351,775 B1 | 2/2002 | Yu | |
| 6,985,937 B1 | 1/2006 | Keshav et al. | |
| 7,760,643 B2 * | 7/2010 | Kim et al. | 370/235 |
| 8,533,710 B1 * | 9/2013 | Long et al. | 718/1 |
| 2008/0256533 A1 * | 10/2008 | Ben-Yehuda et al. | 718/1 |
| 2009/0013325 A1 | 1/2009 | Kobayashi et al. | |
| 2009/0019137 A1 | 1/2009 | Mishra et al. | |

OTHER PUBLICATIONS

Wood, T. et al., Block-box and Gray-box Strategies for Virtual Machine Migration, 2007, Usenix Assoc., NSDI '07, pp. 229-242.

* cited by examiner

*Primary Examiner* — Eric Coleman

(57) ABSTRACT

An analytics engine receives real-time statistics from a set of virtual machines supporting a line of business (LOB) application. The statistics relate to computing resource utilization and are used by the analytics engine to generate a prediction of demand for the LOB application in order to dynamically control the provisioning of virtual machines to support the LOB application.

20 Claims, 5 Drawing Sheets

VIRTUAL MACHINE UTILITY COMPUTING METHOD AND SYSTEM

CROSS-REFERENCE TO RELATED APPLICATIONS

This application is a Continuation of co-pending U.S. patent application Ser. No. 12/366,008, filed Feb. 5, 2009, now issued as U.S. Pat. No. 8,336,049 which is incorporated by reference herein.

BACKGROUND OF THE INVENTION

A "line-of-business" (LOB) application refers to one of critical computer applications, such as accounting, supply chain management and resource planning, that are needed to run an enterprise. Many enterprises utilize service-oriented architectures (SOAs) to more efficiently implement their LOB applications. Service-oriented architectures provide particular business processes as services that are accessible over a network and that interoperate with each other to provide a number of LOB applications.

Current "cloud computing" or computing infrastructure service providers offer a web service that is structured to allow enterprises to rent computers on which the enterprises run their own computer applications. Using this service, enterprises are able to construct their LOB applications as outsourced web services using SOA or encapsulate their LOB applications in a single server or group of servers. The enterprises are charged for the use of this service through a "utility computing" model, by which they are charged for the leased computers on an as-needed basis, similar to the metered services of traditional public utilities such as electricity, water and natural gas.

Despite utility computing models of payment, enterprises using cloud computing to offer LOB applications must still currently rent and provision computing resources to accommodate peak utilization requirements. For example, an IT system processing retail orders must at all times be ready to accommodate peaks. However, real world use indicates that use requirements will vary over time, and includes spikes that occur due to seasonal consumer trends.

SUMMARY OF THE INVENTION

One or more embodiments of the present invention provide a virtual machine utility computing method and system that can predict demand and automatically adjust computing resource usage to accommodate changes in such predicted demand over time.

In one embodiment, an analytics engine is used for demand prediction. The analytics engine receives resource utilization statistics from a set of virtual machines supporting, for example, an LOB application, and generates a prediction of future demand based on the received resource utilization statistics and expected utilization data. It then provides instructions to provision virtual machines according to such a prediction. Such an analytics engine enables an enterprise to match its computing costs on a "per virtual machine" basis for the LOB application to changing demands for the application over time.

A method, according to an embodiment of the invention, provides for allocating virtual machines to support changing computing resource requirements of an application over time. The method includes the steps of generating a prediction of future virtual machine utilization for the application based upon past resource utilization statistics, receiving resource utilization statistics from a set of virtual machines currently supporting the application, adjusting the prediction using the received resource utilization statistics, and transmitting instructions relating to provisioning virtual machines for the application in accordance with the adjusted prediction.

DETAILED DESCRIPTION

Figure 1:
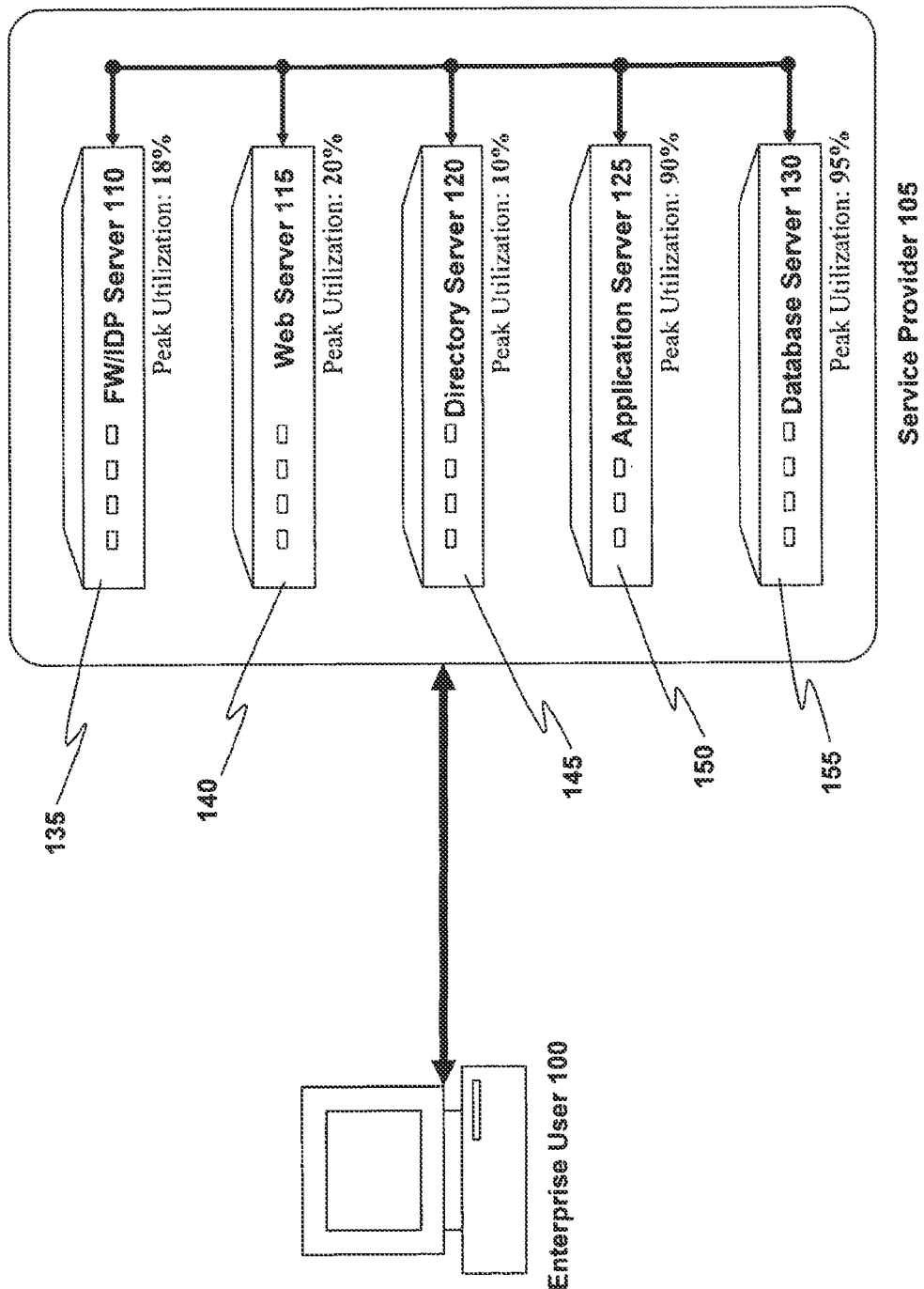
FIG. 1 depicts a non-virtualized LOB application deployed through a service oriented architecture.

FIG. 1 depicts a non-virtualized line of business (LOB) application deployed through a service oriented architecture. FIG. 1 exemplifies a generic deployed architecture that may be outsourced by an enterprise to a computing infrastructure service provider, and it should be recognized that numerous variations to FIG. 1 are possible. A user 100 at the enterprise accesses the LOB application as a networked service which exists as a collection of interoperating services deployed at computing infrastructure service provider 105. Each of the services, FW/IDP (Firewall/Intrusion Detection Prevention) server 110, web server 115, directory server 120, application server 125 and database server 130, are implemented on its own hardware server, 135 to 155, respectively. As shown in FIG. 1, each of the hardware servers are underutilized even during peak utilization, with FW/IDP server 110 using only 18% of its hardware server's 135 capacity, web server 115 using 20% of its hardware server's 140 capacity, directory server 120 using 10% of its hardware server's 145 capacity, application server 125 using 90% of its hardware server's 150 capacity, and database server 130 using 95% of its hardware server's 155 capacity.

Figure 2:
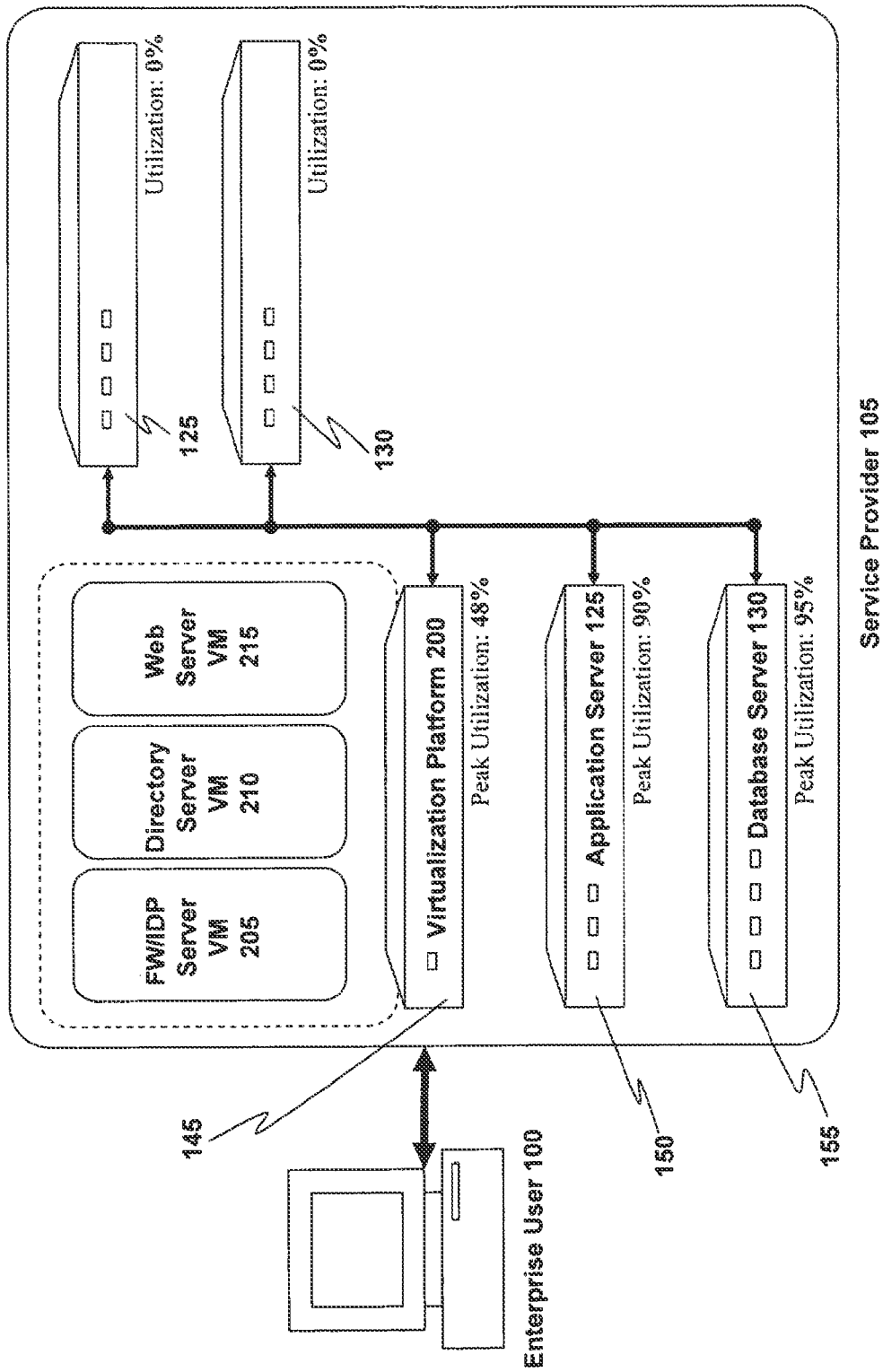
FIG. 2 depicts a LOB application deployed at a computing infrastructure service provider utilizing virtualization.

FIG. 2 depicts the LOB application of FIG. 1 deployed at a computing infrastructure service provider utilizing virtualization. By implementing a virtualization platform 200 on hardware server 145, FW/IDP server 110, web server 115 and directory server 120 are able to be instantiated as virtual machines 205, 210 and 215 running on top of virtualization platform 200. By consolidating these services onto a single hardware server 145, the enterprise experiences cost reductions by freeing up hardware server 125 and 130. It should be recognized that the virtualization platform can be deployed across any number of a service provider's hardware servers. For example, hardware servers 150 and 155 may also deploy a virtualization platform and run application server 125 and database server 130, respectively, in virtual machines instantiated on top of the virtualization platform. One example of a virtualization platform 200 that may be used in an embodiment of the invention is VMware's ESX® product, available from VMware™ Inc. of Palo Alto, Calif.

Figure 3:
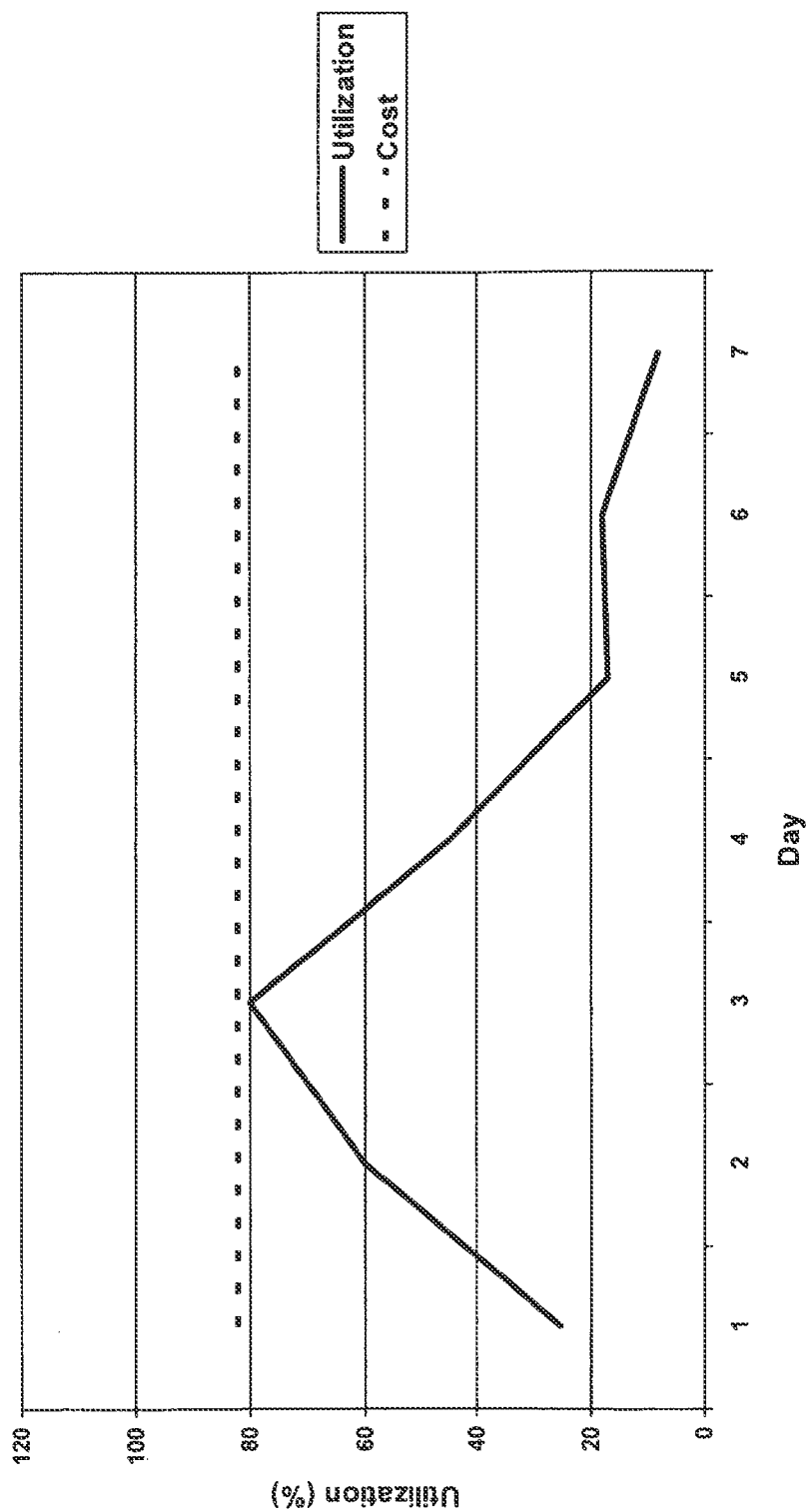
FIG. 3 is a chart depicting computing resource utilization of an LOB application over time.

FIG. 3 is a chart depicting computing resource utilization of an LOB application over time. Although virtualization techniques reduce costs from a hardware allocation perspective as depicted in FIG. 2, enterprises still currently allocate computing resources (e.g., virtual machine instantiations) to accommodate usage under peak demand despite actual usage varying over time. For example, FIG. 3 depicts computing resource usage over a 7 day period. While peak usage only occurs on Day 3, daily infrastructure costs across all 7 days, as depicted by the dotted line, remains at a level that can accommodate the peak usage of Day 3.

Figure 4:
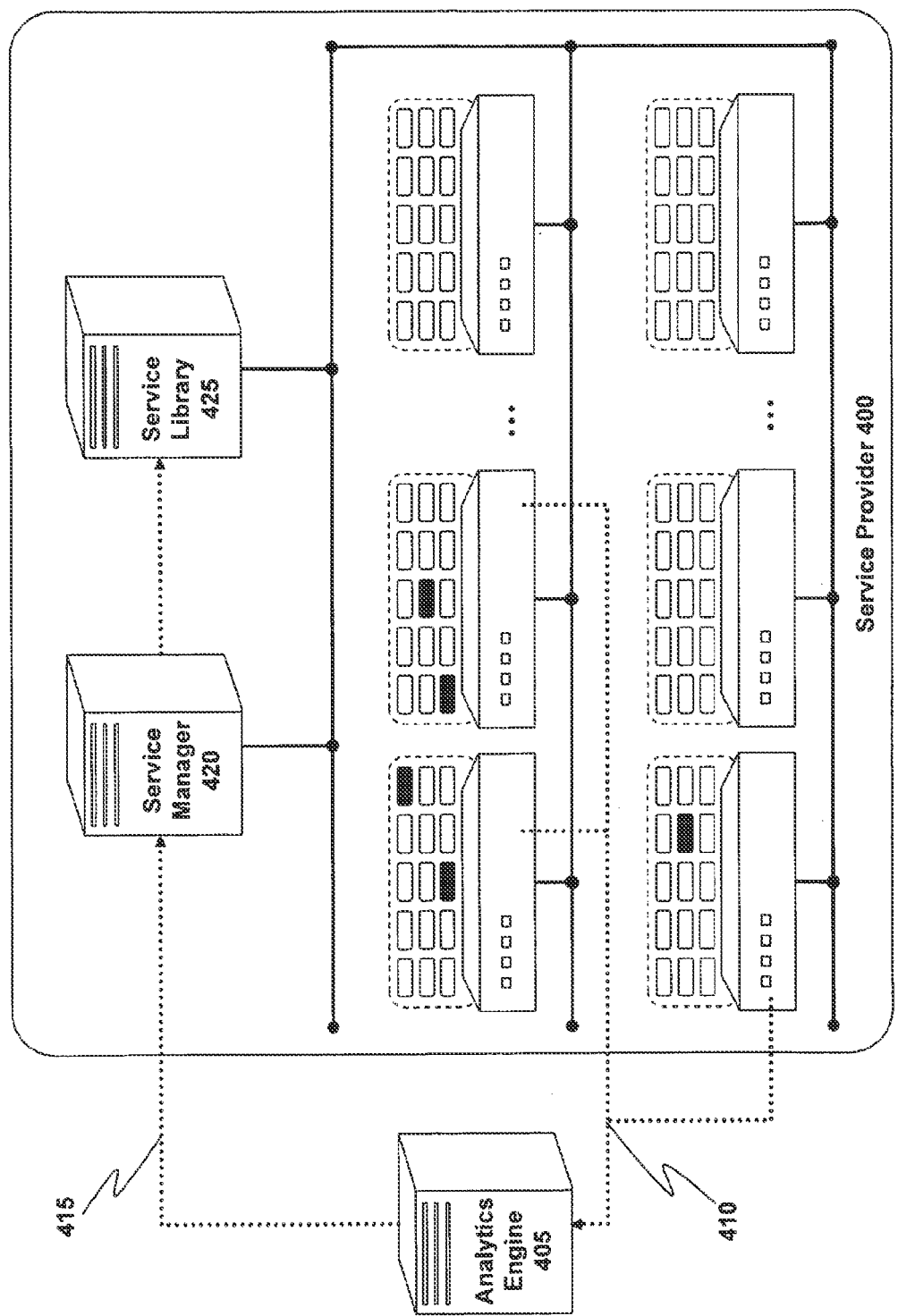
FIG. 4 depicts an architecture to deploy LOB applications using a predictive feedback control mechanism.

FIG. 4 depicts a service delivery architecture to deploy LOB applications using a predictive feedback control mechanism. Computer infrastructure service provider 400 provides a virtualization infrastructure with a collection of hardware servers on which virtual machines can be instantiated by the service provider's customers. Analytics engine 405 may be run on a computer system at a customer's location. Virtual machines that have been instantiated for the customer (shown as black ovals in FIG. 4) at service provider 400 to provide a customer's LOB application periodically transmit real-time performance statistics to analytics engine 405 (see arrow 410). Analytics engine 405 communicates with service manager 420 to instruct service provider 400 to provision (e.g., instantiate, start, stop, suspend and de-allocate, etc.) virtual machines in accordance with predicted demand for the LOB application as derived by analytics engine 405 (see arrow 415). Upon receiving such instructions from analytics engine 405, service manager 420, in turn, communicates with service library 425, which stores the relevant technology (e.g., platform, software, data, etc.) that is needed to provision a particular virtual machine (e.g., to run an application server, database server, directory server, web server, etc.) for a customer's particular needs. It should be recognized that the architecture of FIG. 4 may also be implemented within a single enterprise. For example, service provider 400 may provide analytics engine 405 as an additional service to a customer (including by running analytics engine 405 within a virtual machine). Alternatively, the architecture may also be implemented internally within a customer's own IT function. It should further be recognized that any number and tiers of virtual machines may be used to support the architecture, including using virtual machines to support analytics engine 405, service manager 420 and service library 425, themselves (in addition to supporting the LOB applications).

Figure 5:
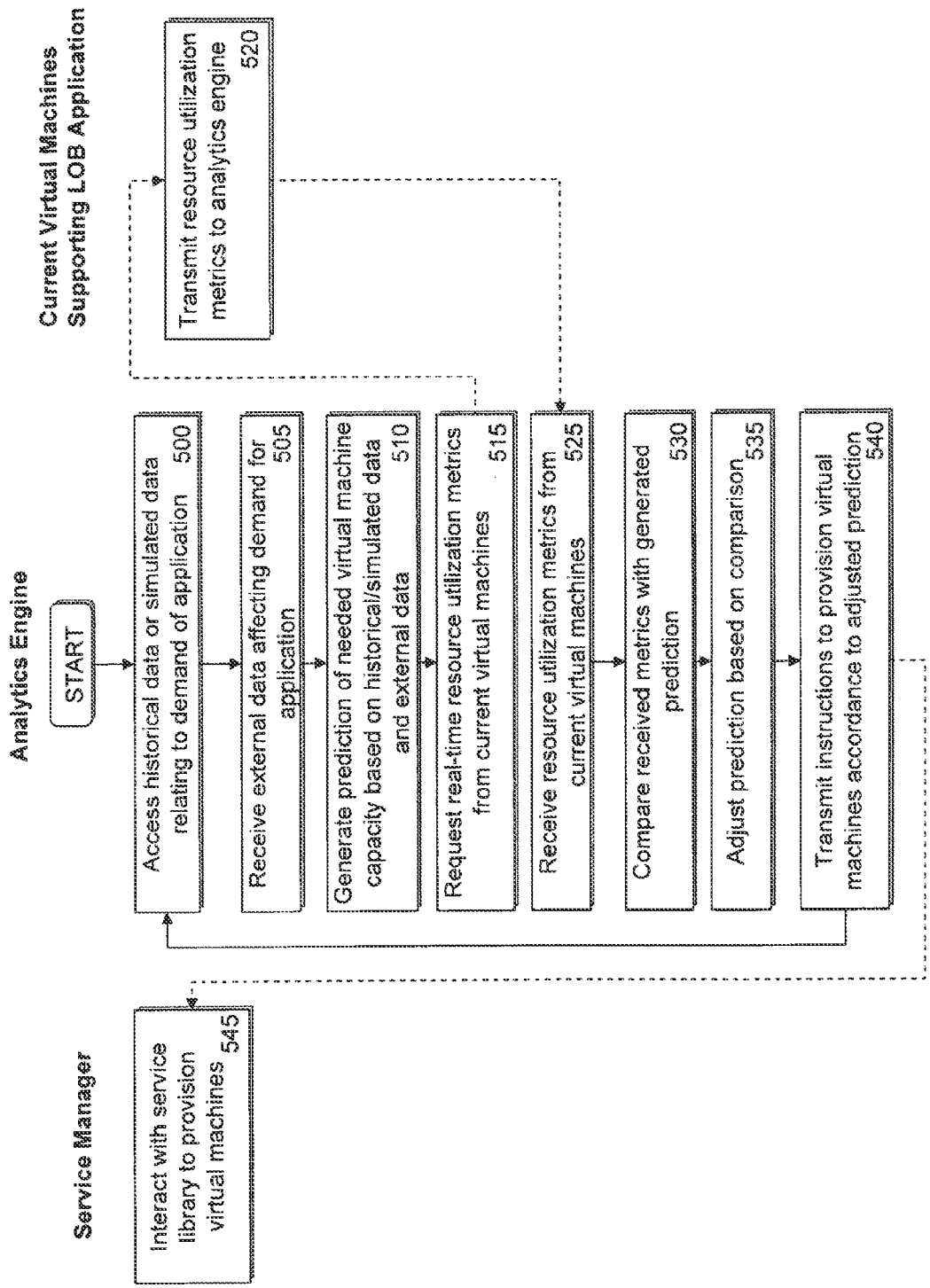
FIG. 5 depicts a flow chart of the process of transmitting instructions to a service provider in accordance with a predicted demand for an LOB application.

FIG. 5 depicts a flow chart of the process of transmitting instructions to service manager 420 in accordance with a predicted demand for an LOB application. In step 500, analytics engine 405 accesses a database of past historical data or simulated data. Such data may be, for example and without limitation, sales, financial, transactional, trend analysis, inventory, manufacturing or any other type of data related to the use of the LOB application. In step 505, analytics engine 405 receives external data that may affect demand for the LOB application. One example of such external data is real time data corresponding to the type of historical or simulated data accessed in step 500. Such external data may be received, for example, from other parts of an enterprise's ERP (enterprise resource planning) system. In step 510, utilizing the past or simulated data and external data, analytics engine 405 generates a prediction of virtual machine capacity for its LOB application. It should be recognized that any of a variety of prediction transfer functions may be used to generate such a prediction, including, for example, those used by traditional capacity planning, forecasting tools, or adaptive predictive feedback control systems. In step 515, analytics engine 405 monitors (e.g., periodically issues requests for) the resource utilization metrics of the current set of virtual machines running at service provider 400 to support the LOB application. In one embodiment where virtual machines are implemented using VMware's ESX server, analytics engine 405 may, for example, issue QueryPerf requests to the virtual machines to obtain such metrics. In step 520, each of the current set of virtual machines transmits its resource utilization metrics to analytics engine 405. In step 525, analytics engine 405 receives the resource utilization metrics. In step 530, analytics engine 405 compares the received utilization metrics with the generated prediction from step 510 and, in step 535, adjusts its generated prediction based upon the comparison. In step 540, analytics engine 405 transmits instructions to provision virtual machines for future demand to service manager 420 at service provider 400 in accordance with the adjusted generated prediction. In step 545, service manager 420 interacts with service library 425 to provision virtual machines in accordance with the adjusted prediction. The process then returns to step 500 to continuing analyzing historical and real-time data and adjusting predicted demand in accordance to real-time actual utilization feedback from the virtual machines (e.g., from step 520).

In one embodiment of the invention, the resource utilization metrics received from the current virtual machines supporting the LOB application in step 520 are utilized as coefficients of a prediction filter of the form:

$$\tilde{x}(n) = a_1 x(n-1) + a_2 x(n-2) + \ldots + a_M x(n-M) = \sum_{i=1}^{M} a_i x(n-i)$$

where M is the total number of samples in a sample interval, and $a_1 x(n-1) \ldots a_M x(n-M)$ are representative of past, present, and future samples of an interval of time, with $a_M$ as the sample at a time t=0. $\tilde{x}(n)$ is the predicted value of x(n), the current sample. For example, in one embodiment, a sample may be representative of a configuration of virtual machines to support a certain demand that is derived from historical data of step 500 for a certain instance in time. An error measurement between predicted and actual is:

$$\varepsilon(n) = x(n) - \tilde{x}(n) = x(n) - \sum_{i=1}^{M} a_i x(n-i)$$

where $a_1$ through $a_M$ can be derived from the resource utilization metric samples taken at n sample intervals. In such an embodiment, this error measurement is derived during the comparison of step 530 of FIG. 5 and used to adjust the predicted demand when communicating with service manager 420 in steps 535-540.

It should be recognized that once a prediction is generated and continually adjusted in accordance with FIG. 5, a billing platform can be layered on top of the foregoing infrastructure in order to charge customers on a per-virtual machine/unit-time basis or resources (e.g., memory, CPU utilization, etc.) used per-virtual machine/unit-time basis, thereby providing a dynamic virtual machine cost and pricing granularity for a service provider's utility computing business model. Such a billing platform can automatically adjust a customer's costs over time in accordance with the adjustments made to the provisioning of virtual machines as described in FIG. 5.

Those with ordinary skill in the art will recognize that the embodiments described herein are merely exemplary and that various alternative embodiments may be implemented consistent with the teaching disclosed herein. For example, it should be recognized that any type of service, application or application service provider (ASP) service may be supported by the foregoing infrastructure and not just LOB applications. Similarly, while the foregoing has described an analytics engine as being located at an enterprise, it should be recognized that a service provider or independent third party may also offer a similar analytics engine to an enterprise customer. It should further be recognized that an enterprise may also utilize an infrastructure as described herein for internal efficiency gains and cost reductions, without a computing resource or cloud computing service provider involved.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for allocating virtual machines to support changing computing resource requirements of an application over time, the method comprising:
   accessing resource utilization statistics for the application, the resource utilization statistics comprising past resource utilization statistics for the application and resource utilization statistics from one or more virtual machines currently supporting the application;
   generating a prediction of future virtual machine utilization for the application based on the accessed resource utilization statistics; and
   transmitting instructions for provisioning one or more virtual machines for the application in accordance with the prediction.

2. The method of claim 1, further comprising:
   monitoring resource utilization statistics associated with the provisioned one or more virtual machines;
   generating a second prediction based on the monitoring; and
   transmitting instructions for provisioning one or more virtual machines for the application in accordance with the second prediction.

3. The method of claim 2, wherein monitoring resource utilization statistics associated with the provisioned one or more virtual machines comprises receiving updated resource utilization statistics from the provisioned one or more virtual machines.

4. The method of claim 1, further comprising:
   recording a metric corresponding to the provisioning of virtual machines; and
   applying the metric in a bill to a customer for use of the provisioned one or more virtual machines.

5. The method of claim 4, wherein the metric is a number of virtual machines instantiated by the customer over a unit of time.

6. The method of claim 4, wherein the metric is an amount of computing resources used by the customer over a unit of time.

7. The method of claim 6, wherein the computing resources include virtual machine memory and virtual processor utilization.

8. The method of claim 1, wherein provisioning virtual machines comprises at least one of instantiating a virtual machine, starting a virtual machine, stopping a virtual machine, suspending a virtual machine, and de-allocating a virtual machine.

9. The method of claim 1, wherein the accessed resource utilization statistics are used as coefficients of a prediction filter.

10. A computer system for allocating virtual machines to support changing computing resource requirements of an application over time, the computer system comprising:
 a data store memory for storing past resource utilization statistics relating to a demand for the application; and
 a processor programmed to:
  access past resource utilization statistics for the application from the data store memory;
  receive resource utilization statistics from one or more virtual machines currently supporting the application;
  generate a prediction of future virtual machine utilization for the application based on the past resource utilization statistics and the resource utilization statistics from the one or more virtual machines currently supporting the application; and
  transmit instructions for provisioning one or more virtual machines for the application in accordance with the prediction.

11. The computer system of claim 10, wherein the processor is further programmed to:
 monitor resource utilization statistics associated with the provisioned one or more virtual machines;
 generate a second prediction based on the monitoring; and
 transmit instructions for provisioning one or more virtual machines for the application in accordance with the second prediction.

12. The computer system of claim 11, wherein monitoring resource utilization statistics associated with the provisioned one or more virtual machines comprises receiving updated resource utilization statistics from the provisioned one or more virtual machines.

13. The computer system of claim 10, wherein the processor is further programmed to record a metric corresponding to the provisioning of the one or more virtual machines, wherein the metric is applied to a bill to a customer for use of the provisioned one or more virtual machines.

14. The computer system of claim 13, wherein the metric is one of the following: a number of virtual machines instantiated by the customer over a unit of time, or an amount of computing resources used by the customer over a unit of time.

15. The computer system of claim 10, wherein the past resource utilization statistics comprise simulated statistics.

16. A non-transitory computer readable storage medium having stored therein a computer program for allocating virtual machines to support changing computing resource requirements of an application over time, wherein a computer system executing the computer program carries out the steps of:
 accessing resource utilization statistics for the application, the resource utilization statistics comprising past resource utilization statistics for the application and resource utilization statistics from one or more virtual machines currently supporting the application;
 generating a prediction of future virtual machine utilization for the application based on the accessed resource utilization statistics; and
 transmitting instructions for provisioning one or more virtual machines for the application in accordance with the prediction.

17. The non-transitory computer readable storage medium of claim 16, wherein the computer system executing the computer program further carries out the steps of:
 monitoring resource utilization statistics associated with the provisioned one or more virtual machines;
 generating a second prediction based on the monitoring; and
 transmitting instructions for provisioning one or more virtual machines for the application in accordance with the second prediction.

18. The non-transitory computer readable storage medium of claim 17, wherein monitoring resource utilization statistics associated with the provisioned one or more virtual machines comprises receiving updated resource utilization statistics from the provisioned one or more virtual machines.

19. The non-transitory computer readable storage medium of claim 16, wherein provisioning virtual machines comprises at least one of instantiating a virtual machine, starting a virtual machine, stopping a virtual machine, suspending a virtual machine, and de-allocating a virtual machine.

20. The non-transitory computer readable storage medium of claim 16, wherein the computer system executing the computer program further carries out the steps of:
 recording a metric corresponding to the provisioning of the one or more virtual machines; and
 applying the metric in a bill to a customer for use of the provisioned one or more virtual machines.

\* \* \* \* \*